United States Patent Office 3,177,183
Patented Apr. 6, 1965

3,177,183
PROCESS FOR PREPARATION OF CIS-POLYBUTADIENE
Floyd E. Naylor and Ralph C. Farrar, Jr., Bartlesville, Okla., assignors to Phillips Petroleum Company, a corporation of Delaware
No Drawing. Filed Feb. 23, 1961, Ser. No. 90,920
12 Claims. (Cl. 260—82.1)

This invention relates to an improved process for polymerizing 3-butadiene so as to obtain a rubbery polymer. In accordance with one aspect, this invention relates to an improved process for producing a polybutadiene having a high percentage of cis-1,4-addition. In another aspect, this invention relates to the process for preparing a rubbery cis-polybutadiene which can be readily processed.

In recent years, there has been a great deal of activity in the development of processes for producing olefin polymers. Polymers of monoolefins, such as ethylene and propylene, prepared by these processes, has received wide acceptance by many industries. The more recent discovery in the field of diene polymerization of certain so-called stereospecific catalysts, which make possible the formation of polymers having a desired configuration, has aroused considerable interest. The polymers formed by the use of these catalysts often have outstanding physical properties which render them equal to or even superior to natural rubber.

Polybutadiene having a high cis content can be prepared in the presence of initiator systems comprising certain organometal compounds and titanium tetrachloride employed in conjunction with either titanium tetraiodide or iodine. Polymers produced in this manner have many desirable physical properties and are useful in numerous commercial applications. It has been observed, however, that they are frequently relatively difficult to process in conventional equipment and unlike many of the synthetic rubbers they do not break down to any appreciable extent upon milling. The present invention is concerned with an improved process for preparing a polybutadiene containing a high percentage of cis-1,4-addition which can be readily processed.

Accordingly, an object of this invention is to provide an improved process for producing a rubbery polymer of 1,3-butadiene.

Another object of this invention is to provide an improved process for polymerizing 1,3-butadiene so as to produce a rubbery polymer which contains a high percentage of cis-1,4-addition and which is readily processable.

Other and further objects and advantages of the invention will become apparent to those skilled in the art upon consideration of the accompanying disclosure and the appended claims.

Broadly speaking, according to the invention, polybutadiene containing a high percentage of cis-1,4-addition is formed by contacting 1,3-butadiene with a catalyst or initiator system formed by admixing (a) an organometal compound corresponding to the formula $R_nM$, wherein R is a hydrocarbon radical containing from 1 to 20, inclusive, carbon atoms, M is a metal selected from the group consisting of aluminum, magnesium and lead, and $n$ is equal to the valence of the metal; (b) titanium tetrachloride; and (c) a component selected from the group consisting of (1) titanium tetraiodide, and, when M is aluminum or magnesium, (2) iodine, in the presence of a small amount of isoprene sufficient to improve the processability of the polymerization product but not exceeding 5 parts by weight of isoprene per 100 parts of 1,3-butadiene in the polymerization system.

It has now been found that in the polymerization of butadiene in the presence of the aforementioned initiator systems, numerous advantages are realized by the inclusion of less than 5 parts by weight of isoprene per 100 parts of butadiene in the polymerization system. When operating at a given initiator level, the addition of a very small amount of isoprene results in a marked decrease in inherent viscosity, thereby improving the processability of the polymer. It is, therefore, possible to employ an initiator level which normally gives a high inherent viscosity polymer and by inclusion of a small amount of isoprene in the system produce a polymer in the processable range. Polymers thus prepared have a higher cis content than is obtained in the absence of isoprene. Another advantage is that isoprene-modified polymers undergo considerable breakdown when milled whereas similar polymers prepared in the absence of isoprene do not break down readily. A further advantage of this invention is that initiator requirements are lower for the preparation of a given type of polymer than in systems without isoprene, thus effecting considerable savings in initiator cost.

The present process provides a means for controlling the molecular weight of cis-polybutadiene through the use of small amounts of isoprene, less than 5 parts by weight being required per 100 parts of butadiene. In fact, results such as herein described are not achieved with larger quantities of isoprene. The amount of isoprene used is generally in the range from 0.1 to 4.5 parts by weight, preferably 0.5 to 4 parts by weight, per 100 parts of butadiene. Since its presence tends to cause some decrease in conversion rate, it is desirable to keep the quantity of isoprene as low as possible. As hereinbefore stated, the action of isoprene as a modifier for cis-polybutadiene is specific to initiator systems containing titanium tetrachloride, that is, titanium tetrachloride and an organometal compound, as defined above, used in conjunction with titanium tetraiodide or iodine.

Organometal compounds that can be employed as one component of the initiator systems of the invention can be represented by the formula $R_nM$, wherein R represents an alkyl, cycloalkyl, aryl, aralkyl radical containing up to and including 20 carbon atoms, with the R groups being alike or different, M is a metal selected from the group consisting of aluminum, magnesium and lead, and $n$ is equal to the valence of the metal.

Examples of representative organoaluminum compounds that can be used include trimethylaluminum,
triethylaluminum,
triisobutylaluminum,
tri-n-pentylaluminum,
triisooctylaluminum,
tri-n-dodecylaluminum,
dimethylethylaluminum,
n-propyldidodecylaluminum,
di-n-butylcyclohexylaluminum,
hexyldiphenylaluminum,
tripentadecylaluminum,
trieicosylaluminum,
triphenylaluminum,
diphenylalphanaphthylaluminum,
tri(2,4-dimethylphenyl)aluminum,
heptyldibenzylaluminum, and the like.

Examples of representative organomagnesium compounds that can be used include dimethylmagnesium,
diethylmagnesium,
di-n-propylmagnesium,
di-tert-butylmagnesium,
di-n-hexylmagnesium, didecylmagnesium,
di(tridecyl)magnesium,
dieicosylmagnesium,
dicyclohexylmagnesium,
di-4-methylcyclohexylmagnesium,
dibenzylmagnesium,
di(4-phenyl-n-butyl)magensium,
diphenylmagnesium,
di-1-naphthylmagnesium,
di-4-tolylmagnesium,
di(2,4-diethylphenyl)magnesium,
di(3,5-di-n-heptylphenyl)magnesium,
methylethylmagnesium,
methylphenylmagnesium, and butylbenzylmagnesium.

Examples of representative organolead compounds that can be used include
tetramethyllead,
tetraethyllead,
tetra-n-propyllead,
tetra-tert-butyllead,
tetra-n-hexyllead,
tetradecyllead,
tetra(tridecyl)lead,
tetraeicosyllead,
tetracyclohexyllead,
tetra-4-methylcyclohexyllead,
tetrabenzyllead,
tetra(4-phenyl-n-butyl)lead,
tetraphenyllead,
tetra-1-naphthyllead,
tetra-4-tolyllead,
tetra(2,4-diethylphenyl)lead,
tetra(3,5-di-n-heptylphenyl)lead,
dimethyldiethyllead,
dimethyldiphenyllead,
methylethyldiphenyllead, and tri-n-butylphenyllead.

Specific initiator systems that can be used for the production of cis-polybutadiene containing a high percentage of cis-1,4-addition include triisobutylaluminum-titanium tetrachloride-titanium tetraiodide, triisobutylaluminum-titanium tetrachloride-iodine, triethylaluminum-titanium tetrachloride-titanium tetraiodide, triphenylaluminum-titanium tetrachloride-iodine, diphenylmagnesium-titanium tetrachloride-titanium tetraiodide, diphenylmagnesium-titanium tetrachloride-iodine, tetraethyllead-titanium tetrachloride-titanium tetraiodide, and the like.

The amount of catalyst or initiator employed during polymerization will vary appreciably and the actual initiator level employed will be determined, at least in part, by the molecular weight of the product which is desired. In general, however, the minimum initiator level below which conversion is not generally obtained is about 1.0 gram millimole of organometal compound per 100 grams of the 1,3-butadiene being polymerized. From a practical standpoint, the upper catalyst or initiator level is generally not above about 20 gram millimoles of organometal compound per 100 grams of 1,3-butadiene.

The mole ratio of organometal compound to total titanium in the initiator system will vary appreciably and will be dependent, at least in part, upon the particular system employed. However, within any given initiator system it is necessary that the ratio be maintained within that ratio peculiar to that initiator system in order to initiate and sustain the reaction. Generally, the mole ratio of metal/Ti will be in the range 0.75:1 to 15:1. It is to be understood that the optimum mole ratio may be different for the various organometals. For example, for Al/Ti the mole ratio is generally in the range of 2:1 to 15:1, for Mg/Ti the mole ratio is generally in the range of 0.75:1 to 3:1, and for Pb/Ti the ratio is ordinarily in the range of 1:1 to 2:1 although the initial ratio is sometimes higher. The mole ratio of $TiCl/TiI_4$ in all systems is in the range of 0.5:1 to 5:1. The mole ratio of $TiCl_4/I_2$ in organoaluminum systems is in the range of 0.25:1 to 10:1 and in organomagnesium systems is ordinarily in the range of 0.5:1 to 1.25:1.

The polymerization process of this invention is usually carried out in the presence of a diluent. Diluents suitable for use in the process are hydrocarbons which are not detrimental to the polymerization reaction. Suitable diluents include aromatics, such as benzene, toluene, xylene, ethylbenzene and mixtures thereof. It is also within the scope of the invention to use straight and branched chain paraffins which contain up to and including 10 carbon atoms per molecule. Examples of paraffins which can be utilized include propane, normal butane, normal pentane, isopentane, normal hexane, isohexane, 2,2,4-trimethylpentane (isooctane), normal decane, and the like. Mixtures of these paraffinic hydrocarbons can also be employed as diluents in the practice of the process of this invention. Cycloparaffins, such as cyclohexane and methylcyclohexane, can also be used. Furthermore, mixtures of any of the aforementioned hydrocarbons can be used as diluents.

The polymerization method of this invention can be carried out at any temperature within the range of −100 to 250° F., preferably −30 to 160° F. The polymerization reaction can be carried out undr autogenous pressure or any suitable pressure sufficient to maintain the reaction mixture substantially in the liquid phase. The pressure will thus depend upon the particular diluent being employed and the temperature at which the polymerization is carried out. However, higher pressures can be employed if desired, these pressures being obtained by some such suitable method as the pressurization of the reactor with a gas which is inert with respect to the polymerization reaction. It is to be understood also that it is within the scope of the invention to carry out the polymerization in the solid phase.

The process of this invention can be carried out as a batch process by charging 1,3-butadiene into a reactor containing catalyst and diluent. Although any suitable charging procedure can be used, it is usually preferred to add the catalyst components to a reactor containing diluent and thereafter introduce the 1,3-butadiene. It is also within the scope of the invention to preform the catalyst by reacting the catalyst components in a separate catalyst preparation vessel. The resulting reaction product is then charged to the reactor containing monomer and diluent, or these latter materials can be added after the catalyst. The process can also be carried out continuously by maintaining the above-mentioned concentrations of reactants in the reactor for a suitable residence time. The residence time in a continuous process will, of course, vary within rather wide limits depending upon such variables as temperature, pressure, the ratio of catalyst components, and the catalyst concentrations. In a continuous process the residence time will generally fall within the range of 1 second to 1 hour when conditions within the specified ranges are employed. When a batch process is being utilized, the time for the reaction can be as high as 24 hours or more.

Various materials are known to be detrimental to the catalyst compositions of this invention. These materials include carbon dioxide, oxygen and water. It is highly desirable, therefore, that the 1,3-butadiene be freed of these materials as well as other materials which tend to inactivate the catalyst. Any of the known means for removing such contaminants can be used. Also, when a diluent is employed in the process, it is preferred that this material be substantially free of impurities such as water, oxygen and the like. In this connection, it is desirable to remove air and moisture from the reaction vessel in which the polymerization is conducted. Although it is preferred to carry out the polymerization under anhydrous or substantially anhydrous conditions, it is to be understood that some small amounts of these catalyst-inactivating materials can be tolerated in the reaction mixture. However, it is also to be understood that the amount of such materials which may be tolerated in the reaction mixture is insufficient to cause complete deactivation of the catalyst.

At the completion of the polymerization reaction, when a batch process is used, the total reaction mixture is then treated to inactivate the catalyst and precipitate the rubbery product. Any suitable method can be utilized for carrying out this treatment of the reaction mixture. In one suitable method a catalyst-inactivating material, such as water or an alcohol, is added to the mixture so as to inactivate the catalyst and cause precipitation of the polymer. The polymer is then separated from the alcohol or water and diluent by any suitable means such as decantation or filtration. It is often preferred to add initially only an amount of the catalyst-inactivating material which is sufficient to inactivate the catalyst without causing precipitation of the dissolved polymer. It has also been found to be advantageous to add an antioxidant, such as phenyl-beta-naphthylamine, to the polymer solution prior to precipitation of the polymer. After addition of the catalyst-inactivating agent and the antioxidant, the polymer present in the solution can then be separated by the addition of an excess of a material such as ethyl alcohol or isopropyl alcohol. When the process of the invention is carried out continuously, the total effluent from the reactor can be pumped from the reactor to a catalyst-inactivating zone wherein the reactor effluent is contacted with a suitable catalyst-inactivating material, such as an alcohol. When an alcohol is used as a catalyst-inactivating material, it also functions to precipitate the polymer. In the event other catalyst-inactivating materials are employed, which do not perform this dual role, a suitable material, such as an alcohol, can then be added to precipitate the polymer. It is, of course, to be realized that it is within the scope of the invention to employ other suitable means to recover the polymer from solution. After separation from the solvent mixture and alcohol by filtration or other suitable means, the polymer is dried.

The polymers produced in accordance with this invention are rubbery polymers. The polymers can be compounded by the various methods such as have been used in the past for compounding natural and synthetic rubbers. Vulcanization accelerators, vulcanizing agents, reinforcing agents, and fillers such as have been employed in natural rubber can likewise be used when compounding the polymers of this invention. It is also within the scope of the invention to blend the polymers with other polymers, such as natural rubber, polyethylene, and the like. As mentioned hereinbefore, the polymers of this invention have a high cis-1,4 content which renders them very suitable for applications requiring low hysteresis, high resiliency, low freeze point and easy milling. In general, the polymers have utility in applications where natural and synthetic rubbers are used. They are particularly useful in the manufacture of automobile and truck tires and other rubbery articles, such as gaskets.

A more comprehensive understanding of the invention can be obtained by referring to the following illustrative examples which are not intended, however, to be unduly limitative of the invention.

Samples of certain of the polymer products produced in the runs described in the examples were examined by infrared analysis. This work was carried out in order to determine the percentage of the polymer formed by cis-1,4-addition, trans-1,4-addition, and 1,2-addition of the butadiene. The procedure described hereinafter was employed in making these determinations.

The polymer samples were dissolved in carbon disulfide to form a solution having 25 grams of polymer per liter of solution. The infrared spectrum of each of the solutions (percent transmission) was then determined in a commercial infrared spectrometer.

The percent of the total unsaturation present as trans-1,4 was calculated according to the following equation and consistent units:

$$\epsilon = \frac{E}{tc}$$

where $\epsilon$=extinction coefficient (liters-moles$^{-1}$-centimeters$^{-1}$); $E$=extinction (log $I_0/I$); $t$=path length (centimeters); and $c$=concentration (moles double bond/liter). The extinction was determined at the 10.35 micron band and the extinction coefficient was 146 (liters-moles$^{-1}$-centimeters$^{-1}$).

The percent of the total unsaturation as 1,2- (or vinyl) was calculated according to the above equation, using the 11.0 micron band and an extinction coefficient of 209 (liters-moles$^{-1}$-centimeters$^{-1}$).

The percent of the total unsaturation present as cis-1,4 was obtained by subtracting the trans-1,4 and 1,2-(vinyl) determined according to the above procedures, from the theoretical unsaturation, assuming one double bond per each $C_4$ unit in the polymer.

EXAMPLE I

The amount of isoprene was varied in a series of runs in which butadiene was polymerized in the presence of triisobutylaluminum, titanium tetrachloride, and titanium tetraiodide. The recipe was as follows:

|   | Parts by weight |
|---|---|
| 1,3-butadiene | 100. |
| Toluene | 1200. |
| Isoprene | Variable. |
| Triisobutylaluminum (TBA) | 0.49 (2.5 mmoles). |
| Titanium tetrachloride (TTC) | 0.059 (0.31 mmole). |
| Titanium tetraiodide (TTI) | 0.172 (0.31 mmole). |
| TBA/TTC/TTI mole ratio | 8/1/1. |
| Temperature, ° F. | 41. |
| Time, hours | 3. |

The initiator was performed in toluene and aliquots of the resulting dispersion were added to each polymerization from a calibrated syringe. Polymerization reactions were conducted in capped beverage bottles. Toluene was dried by passing it through a packed column against a counter flow of prepurified nitrogen. Butadiene was dried by passing the vapors through freshly distilled ethylene glycol and was stored over calcium sulfate. The isoprene was flash distilled and dried by purging with prepurified nitrogen.

When carrying out the polymerizations, the dry bottles were charged with toluene and then purged with prepurified nitrogen. They were capped, brought to the reaction temperature by tumbling in a constant temperature bath, the preformed initiator was charged, and was followed immediately by the butadiene and isoprene. After a three-hour polymerization period, the reactions were shortstopped with isopropyl alcohol containing a small amount of 2,2'-methylene-bis(4-methyl-6-tert-butylphenol) as an antioxidant. Polymers were recovered by slow addition, while stirring, of a two- or threefold excess of isopropyl alcohol to the reaction mixture followed by decantation of the supernatant liquid. After vacuum drying at 150° F., all of the polymers were gel-free.

A summary of the runs is presented in the following table:

Table 1

| Run No. | Isoprene, Parts | Conversion, percent | Inherent[A] Viscosity | Microstructure, percent | | |
|---|---|---|---|---|---|---|
| | | | | cis | trans | Vinyl |
| 1 | 0 | 90 | 2.49 | 95.6 | 1.4 | 3.0 |
| 2 | 3.4 | 53 | 1.88 | 95.8 | 1.1 | 3.1 |
| 3 | 1.7 | 68 | 2.16 | 95.8 | 1.2 | 3.0 |
| 4 | 0.7 | 80 | 2.33 | 96.0 | 1.1 | 2.9 |

For footnote, see columns 10 and 11.

These data show that very small amounts of isoprene had a pronounced modifying effect on the polymerization of butadiene. The products had a slightly higher cis content than the control as well as a lower inherent viscosity.

EXAMPLE II

Butadiene was polymerized in two series of runs using a different initiator level in each series and also variable quantities of isoprene. The following recipes were employed:

|  | Parts by Weight | |
|---|---|---|
|  | A | B |
| 1,3-butadiene | 100 | 100 |
| Toluene | 1,100 | 1,200 |
| Isoprene | Variable | Variable |
| Triisobutylaluminum (TBA) | 0.49 | 0.44 |
| Titanium tetrachloride (TTC) | 0.059 | 0.052 |
| Titanium tetraiodide (TTI) | 0.17 | 0.15 |
| TBA/TTC/TTI mole ratio | 8/1/1 | 8/1/1 |
| Temperature, °F | 41 | 41 |
| Time, hours | 6 | 6 |

Polymerization was effected in beverage bottles. Toluene was charged first, the bottles were purged with prepurified nitrogen, and capped. Isoprene, butadiene, and triisobutylaluminum were added, the bottles were brought to polymerization temperature, and initiation was accomplished by the addition of the requisite amount of a 1 weight percent dispersion of titanium halide in toluene. The reactions were shortstopped and the polymers recovered (gel-free) as described in Example I. Results are shown in the following table:

Table II

| Run No. | Isoprene, Parts | Recipe | Conversion, percent | Mooney Value C (ML-4 at 212° F.) | Inherent A Viscosity |
|---|---|---|---|---|---|
| 1 | 0 | A | 100 | 20 | 1.77 |
| 2 | 3.5 | A | 80 |  | 1.56 |
| 3 | 1.7 | A | 84 | 12 | 1.65 |
| 4 | 0 | B | 100 | 36 | 2.24 |
| 5 | 3.5 | B | 84 | 10 | 1.59 |
| 6 | 1.7 | B | 93 | 18 | 1.83 |

For footnote, see columns 10 and 11.

Control Runs 1 and 4 show that the higher initiator level gave a lower Mooney (lower inherent viscosity) polymer. Results in both series of runs demonstrate the modifying action of isoprene. The data also show that initiator requirements are less to prepare a given type of polymer if isoprene is present in the system. This effect is seen by comparing Runs 1 and 6 in which substantially equivalent polymers were produced even though the initiator level in Run 6 was 10 percent less than in Run 1.

EXAMPLE III

Butadiene was polymerized at various temperatures with and without the addition of isoprene. The following recipe was employed:

|  | Parts by weight |
|---|---|
| 1,3-butadiene | 100. |
| Toluene | 1200. |
| Isoprene | Variable. |
| Triisobutylaluminum (TBA) | 0.36 (1.8 mmoles). |
| Titanium tetrachloride (TTC) | 0.042 (0.22 mmole). |
| Titanium tetraiodide (TTI) | 0.12 (0.22 mmole). |
| TBA/TTC/TTI mole ratio | 8/1/1. |
| Temperature, °F | Variable. |
| Time, hours | Variable. |

The procedure was the same as that used in Example II. Results were as follows:

Table III

| Run No. | Temp., °F. | Time, Hours | Isoprene, Parts | Conv., Percent | Inherent A Viscosity | Microstructure, Percent | | |
|---|---|---|---|---|---|---|---|---|
|  |  |  |  |  |  | cis | trans | Vinyl |
| 1 | 14 | 16 | 1.5 | 90 | 3.49 | 96.2 | 1.1 | 2.7 |
| 2 | 14 | 16 | 0 | 90 | 4.19 | 96.0 | 1.3 | 2.7 |
| 3 | 41 | 17 | 1.5 | 95 | 3.06 | 95.4 | 1.6 | 3.0 |
| 4 | 41 | 17 | 0 | 95 | 3.93 | 95.1 | 1.8 | 3.1 |
| 5 | 86 | 3 | 1.5 | 90 | 2.25 | 94.8 | 1.9 | 3.3 |
| 6 | 86 | 3 | 0 | 100 | 2.45 | 94.5 | 2.1 | 3.4 |

For footnote, see columns 10 and 11.

The data show that isoprene behaved as a modifier at each temperature but the effect was more pronounced as the temperature was decreased. The modified polymers had a slightly higher cis content than the unmodified polymers.

EXAMPLE IV

Variable quantities of triisobutylaluminum (TBA), titanium tetrachloride (TTC), and titanium tetraiodide (TTI) were employed for the polymerization of butadiene at 86° F. in systems with and without isoprene. Quantities of butadiene and toluene were the same as in the recipes in the preceding examples. The procedure of Example II was followed and the polymerization time was 3 hours. The runs are summarized in the following table:

Table IV

| Run No. | TBA/TTC/TTI | | Isoprene, Parts | Conv., percent | Inherent A Viscosity | Microstructure, percent | | |
|---|---|---|---|---|---|---|---|---|
|  | Parts | Mole Ratio |  |  |  | cis | trans | Vinyl |
| 1 | 0.40/0.057/0.083 | 20/3/1.5 | 0 | 85 | 2.95 | 95.1 | 1.4 | 3.5 |
| 2 | 0.36/0.057/0.083 | 18/3/1.5 | 0 | 90 | 3.06 | 94.9 | 1.6 | 3.5 |
| 3 | 0.40/0.057/0.083 | 20/3/1.5 | 1.7 | 65 | 2.37 | 95.2 | 1.3 | 3.5 |
| 4 | 0.36/0.057/0.083 | 18/3/1.5 | 1.7 | 80 | 2.68 | 95.2 | 1.3 | 3.5 |
| 5 | 0.34/0.032/0.093 | 10/1/1 | 0 | 100 | 2.95 | 95.0 | 1.7 | 3.3 |
| 6 | 0.34/0.032/0.093 | 10/1/1 | 1.7 | 85 | 2.62 | 95.1 | 1.4 | 3.5 |
| 7 | 0.34/0.032/0.093 | 10/1/1 | 3.4 | 80 | 2.52 | 95.2 | 1.3 | 3.5 |

For footnote, see columns 10 and 11.

Polymers prepared at 86° F. in a system without isoprene generally have an inherent viscosity around 3 if the cis content is high, that is, about 95 percent. Such polymers are very difficult to process. The foregoing data show that high cis polybutadiene of considerably lower inherent viscosity can be prepared at 86° F. if isoprene is used as a modifier for the polymerization.

EXAMPLE V

The following recipe was employed for the polymerization of butadiene:

| | Parts by weight |
|---|---|
| 1,3-butadiene | 100 |
| Toluene | 1200 |
| Isoprene | 2.5 |
| Triisobutylaluminum (TBA) (1.5 mmoles) | 0.297 |
| Titanium tetrachloride (TTC) (0.19 mmole) | 0.036 |
| Titanium tetraiodide (TTI) (0.19 mmole) | 0.106 |
| TBA/TTC/TTI mole ratio | 8/1/1 |
| Temperature, ° F. | 41 |
| Time, hours | 17 |
| Conversion, percent | 100 |

Charge order: Toluene, nitrogen purge, butadiene, isoprene, triisobutylaluminum (0.24 M in n-heptane), cool to 41° F., TTC+TTI (0.04 M dispersion in toluene).

| | |
|---|---|
| Inherent viscosity [A] | 2.55 |
| Mooney Value (ML–4 at 212° F.) [C] | 50 |
| Microstructure, percent— | |
| cis (by difference) | 95.7 |
| Trans | 1.4 |
| Vinyl | 2.9 |

For footnote, see columns 10 and 11.

The above-described isoprene-modified cis-polybutadiene and a 49 Mooney unmodified cis-polybutadiene were each mixed in a Midget Banbury at 40 r.p.m. for 5 minutes at 250° F. followed by two 5-minute mixes at 300° F. The polymers were compounded in accordance with the following recipe:

| | Parts by weight |
|---|---|
| Cis-polybutadiene | 100 |
| Philblack O [1] | 50 |
| Zinc oxide | 3 |
| Stearic acid | 1 |
| Flexamine[2] | 1 |
| Resin 731–D[3] | 5 |
| Philrich 5[4] | 5 |
| Sulfur | 1.75 |
| NOBS Special[5] | 1.0 |

[1] High abrasion furnace black.
[2] Physical mixture containing 65 percent of a complex diarylamine-ketone reaction product and 35 percent of N, N'-diphenyl-p-phenylenediamine.
[3] A disproportionated pale rosin stable to heat and light.
[4] Aromatic oil.
[5] N-oxydiethylene-2-benzothiazyl sulfenamide.

Properties were determined on the original and cured polymers. Results were as follows:

| | Unmodified cis-Polybutadiene | Modified cis-Polybutadiene |
|---|---|---|
| Original Mooney Value (ML–4 at 210° F.)[C] | 49 | 50 |
| Raw ML–4 after premix | 39.3 | 31 |
| Breakdown on mixing, percent | 19.8 | 38.0 |
| Gel, percent after premix | 0 | 0 |
| Compounded Mooney Value (MS–1½ at 212° F.)[C] | 50.0 | 52.0 |
| Scorch at 280° F., min.[D] | 18.5 | 22.0 |
| Extrusion at 250° F.:[E] | | |
| Inches/minute | 26.0 | 26.3 |
| Grams/minute | 62.3 | 65.0 |
| Rating | 6– | 6 |

| Cured 30 Minutes at 307° F. | | |
|---|---|---|
| $\nu \times 10^4$, moles/cc.[K] | 1.90 | 2.06 |
| 300% Modulus, p.s.i.[F] | 1,425 | 1,540 |
| Tensile, p.s.i.[F] | 3,050 | 2,875 |
| Elongation, percent [F] | 540 | 460 |
| Hysteresis $\Delta T$, ° F.[G] | 43.6 | 42.9 |
| Resilience, percent [H] | 77.9 | 77.4 |
| Shore A hardness [I] | 60.5 | 60.0 |

For footnote, see column 11.

The results show that the modified polybutadiene exhibited a much greater breakdown during Banbury mixing than the unmodified polymer and had better processing properties. The modified polymer banded better on the mill than the unmodified polymer and had better scorch resistance. There was no appreciable difference in the properties of the vulcanizates.

EXAMPLE VI

The breakdown of an 82.4 Mooney cis-polybutadiene modified with isoprene was studied. The polymer was prepared in accordance with the following recipe.

| | Parts by weight |
|---|---|
| 1,3-butadiene | 100 |
| Toluene | 1000 |
| Isoprene | 1.7 |
| Triisobutylaluminum (TBA) (1.7 mmoles) | 0.337 |
| Titanium tetrachloride (TTC) (0.113 mmole) | 0.021 |
| Titanium tetraiodide (TTI) (0.113 mmole) | 0.063 |
| TBA/TTC/TTI | 15/1/1 |
| Temperature, ° F. | 41 |
| Time, hours | 22 |

Charge order: Toluene, nitrogen purge, isoprene, butadiene, triisobutylaluminum (0.72 M solution in toluene), cool to 41° F., titanium halides dispersed in toluene.

No reaction occurred after 18 hours. At this time 0.243 millimole each of titanium tetrachloride and titanium tetraiodide were added, making a mole ratio of TBA/TTI/TTC in the system of 7/1/1. The conversion reached 60 percent four hours after addition of the titanium halides. Infrared analysis gave the following results.

| Microstructure, percent: | |
|---|---|
| Cis (by difference) | 96.5 |
| Trans | 0.8 |
| Vinyl | 2.7 |

The polybutadiene was mixed in the Midget Banbury and the Mooney, inherent viscosity, and gel determined at intervals. Results were as follows.

Original:
| | |
|---|---|
| Mooney value (ML–4 at 212° F.) [C] | 82.4 |
| Inherent viscosity [A] | 3.36 |
| Gel, percent [B] | 0 |

Mixed 3 minutes at 300° F. and 40 r.p.m.:
| | |
|---|---|
| Mooney value (ML–4 at 212° F.) [C] | 76 |
| Inherent viscosity [A] | 3.20 |
| Gel, percent [B] | 0 |

Remixed 3 minutes at 300° F. and 40 r.p.m. (6 minutes total):
| | |
|---|---|
| Mooney value (ML–4 at 212° F.) [C] | 64.8 |
| Inherent viscosity [A] | 2.84 |
| Gel, percent [B] | 0 |

Remixed 3 minutes at 300° F. and 40 r.p.m. (9 minutes total):
| | |
|---|---|
| Mooney value (ML–4 at 212° F.) [C] | 54.9 |
| Inherent viscosity [A] | 2.82 |
| Gel, percent [B] | Trace |

Remixed 3 minutes at 300° F. and 40 r.p.m. (12 minutes total):
| | |
|---|---|
| Mooney value (ML–4 at 212° F.) [C] | 48.4 |
| Inherent viscosity [A] | 2.83 |
| Gel, percent [B] | 6 |

These data show that isoprene-modified cis-polybutadiene can be broken down by milling to give a processable polymer.

For footnotes, see below.

[A] One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filter through a sulfur absorption tube of grade C porosity to remove any solid particles present. The resulting solution was run through a Medalia-type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample.

B Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed widemouth, two-ounce bottle. A piece of folded quarter-inch hardware cloth in the bottom of the bottle supported the cage with minimum contact. The bottle containing the cage was weighed to the nearest 0.02 gram during a minimum three-minute draining period after which the cage was withdrawn and then again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration.

C ASTM D927–55T.

D Scorch is determined on a Mooney viscometer at 280° F. using the large rotor (ML–4). The scorch time is the time required for the Mooney value to rise a given amount above the minimum. The procedure is essentially the same as described by Shearer et al., India Rubber World 117, 216–9 (1947).

E Extrusion is carried out at 250° F. by essentially the same procedure as described by Garvey et al., Ind. & Eng. Chem. 34, 1309 (1942).

F ASTM D412–51T. Scott Tensile Machine L–6. Tests made at 80° F.

G ASTM D623–58. Method A. Goodrich Flexometer, 143 lbs./sq. in. load, 0.175 inch stroke. Test specimen is a right circular cylinder 0.7 inch in diameter and one inch high.

H ASTM D945–55 (modified). Yerzley Oscillograph. Test specimen is a right circular cylinder 0.7 inch in diameter and one inch high.

I ASTM D676–55T. Shore Durometer, Type. A.

K Swelling method of Kraus, Rubber World 135, 67–73, 254–260 (1956). This vlaue is the number of network chains per unit volume of rubber. The higher the number, the more the rubber is crosslinked (vulcanized).

As will be evident to those skilled in the art, many variations and modifications of this invention can be practiced in view of the foregoing disclosure. Such variations and modifications are believed to come within the spirit and scope of the invention.

We claim:

1. In a process for the polymerization of 1,3-butadiene in the presence of an initiator system formed by admixing (a) an organometal compound corresponding to the formula $R_nM$, wherein R is selected from the group consisting of alkyl, cycloalkyl, aryl, aralkyl and alkaryl radicals containing from 1 to 20, inclusive, carbon atoms, M is a metal selected from the group consisting of aluminum, magnesium and lead, and $n$ is equal to the valence of the metal, (b) titanium tetrachloride, and (c) a component selected from the group consisting of (1) titanium tetraiodide, and, when M is aluminum and magnesium, (2) iodine, the improvement comprising carrying out the polymerization in the presence of a small amount of isoprene sufficient to improve the processability of the polymerization product but not exceeding 5 parts by weight per 100 weight parts of butadiene.

2. A process according to claim 1 wherein the amount of isoprene present in said polymerization ranges from 0.1 to 4.5 weight parts per 100 parts by weight of butadiene.

3. A process according to claim 1 wherein said organometal compound is an organoaluminum compound.

4. A process according to claim 3 wherein said initiator system is formed by admixing triisobutylaluminum, titanium tetrachloride and titanium tetraiodide.

5. A process according to claim 4 wherein the amount of isoprene present in said polymerization ranges from 0.5 to 4.0 weight parts per 100 parts by weight of butadiene.

6. A process for producing a rubbery polymer of 1,3-butadiene containing a high percentage of cis-1,4-addition which comprises contacting under polymerization conditions 1,3-butadiene with an initiator system formed by admixing (a) an organometal compound corresponding to the formula $R_nM$, wherein R is selected from the group consisting of alkyl, cycloalkyl, aryl, aralkyl and alkaryl radicals containing from 1 to 20, inclusive, carbon atoms, M is a metal selected from the group consisting of aluminum, magnesium and lead, and $n$ is equal to the valence of the metal, (b) titanium tetrachloride, and (c) a component selected from the group consisting of (1) titanium tetraiodide, and, when M is aluminum and magnesium, (2) iodine, in a hydrocarbon diluent and in the presence of isoprene in an amount sufficient to improve the processability of the polymerization product but not exceeding 5 weight parts per 100 weight parts butadiene, and recovering the rubbery polymer so produced.

7. A process according to claim 6 wherein the amount of isoprene present ranges from 0.1 to 4.5 weight parts per 100 parts by weight of butadiene.

8. A process according to claim 6 wherein said organometal compound in said initiator system is an organoaluminum compound.

9. A process according to claim 8 wherein said initiator system is formed by admixing triisobutylaluminum, titanium tetrachloride and titanium tetraiodide.

10. A process for producing a rubbery polymer of 1,3-butadiene containing a high percentage of cis-1,4-addition which comprises contacting 1,3-butadiene at a temperature in the range of −100 to 250° F. and under autogenous pressure with an initiator system formed by admixing (a) a compound corresponding to the formula $R_3Al$, wherein R is a radical selected from the group consisting of alkyl, cycloalkyl, aryl, aralkyl and alkaryl radicals containing up to and including 20 carbon atoms, (b) titanium tetrachloride, and (c) a component selected from the group consisting of (1) titanium tetraiodide and (2) iodine, in a hydrocarbon diluent and in the presence of from 0.1 to 4.5 weight parts isoprene per 100 weight parts of butadiene, and recovering the rubbery polymer so produced.

11. A process according to claim 10 wherein said organoaluminum compound is triisobutylaluminum.

12. A process for producing a rubbery polymer of 1,3-butadiene containing a high percentage of cis-1,4-addition which comprises contacting 1,3-butadiene with an initiator system formed by admixing triisobutylaluminum, titanium tetrachloride and titanium tetraiodide, said contacting occurring in the presence of a hydrocarbon diluent under autogenous pressure and at a temperature in the range −30 to 160° F. and with from 0.5 to 4.0 weight parts of isoprene per 100 weight parts of 1,3-butadiene, the mole ratio of aluminum to total titanium being in the range 2:1 to 15:1 and the mole ratio of said titanium tetrachloride to said titanium tetraiodide being in the range 0.5:1 to 5:1, and recovering the rubbery polymer so produced.

References Cited by the Examiner

UNITED STATES PATENTS

| | | | |
|---|---|---|---|
| 2,938,019 | 5/60 | Stuart | 260—93.7 |
| 2,959,576 | 11/60 | Payne | 260—94.9 |
| 2,979,488 | 4/61 | Carpenter | 260—79 |
| 3,005,811 | 10/61 | Youngman | 260—94.3 |
| 3,036,056 | 5/62 | Rion | 260—94.7 |
| 3,076,795 | 2/63 | Hall | 260—94.7 |

FOREIGN PATENTS 605,055   5/60   Italy.

JOSEPH L. SCHOFER, *Primary Examiner.*

L. H. GASTON, *Examiner.*